United States Patent
Menditto et al.

(10) Patent No.: US 6,981,029 B1
(45) Date of Patent: Dec. 27, 2005

(54) SYSTEM AND METHOD FOR PROCESSING A REQUEST FOR INFORMATION IN A NETWORK

(75) Inventors: Louis F. Menditto, Raleigh, NC (US); Barron C. Housel, Chapel Hill, NC (US); Tzu-Ming Tsang, Chapel Hill, NC (US); Mauro Zallocco, Apex, NC (US); Gaurang K. Shah, Cary, NC (US); Jan Vilhuber, San Luis Obispo, CA (US); Anurag Bhargava, Raleigh, NC (US); Pranav K. Tiwari, Bangalore (IN); Robert M. Batz, Raleigh, NC (US); Scott W. Brim, Ithaca, NY (US)

(73) Assignee: Cisco Technology, Inc., San Jose, CA (US)

( * ) Notice: Subject to any disclaimer, the term of this patent is extended or adjusted under 35 U.S.C. 154(b) by 688 days.

(21) Appl. No.: 09/907,836

(22) Filed: Jul. 17, 2001

(51) Int. Cl.[7] .............................................. G06F 15/16
(52) U.S. Cl. ..................................... 709/217; 709/229
(58) Field of Search ............................... 709/217–219, 709/235, 226–228, 207, 246, 232, 203, 222, 709/225, 229, 227; 707/4, 10; 712/27; 715/523; 718/105; 701/211; 345/740; 370/235, 400; 379/220, 255; 455/67, 188; 340/825; 711/138

(56) References Cited

U.S. PATENT DOCUMENTS

| | | | |
|---|---|---|---|
| 5,740,370 A | * | 4/1998 | Battersby et al. ............ 709/219 |
| 5,905,736 A | | 5/1999 | Ronen et al. ................ 370/546 |
| 5,956,391 A | | 9/1999 | Melen et al. ................ 379/114 |
| 5,970,477 A | | 10/1999 | Roden .......................... 705/32 |
| 6,047,051 A | | 4/2000 | Ginzboorg et al. ......... 379/130 |
| 6,085,234 A | * | 7/2000 | Pitts et al. ................... 709/217 |
| 6,088,737 A | * | 7/2000 | Yano et al. .................. 709/235 |
| 6,092,114 A | * | 7/2000 | Shaffer et al. .............. 709/232 |
| 6,092,178 A | * | 7/2000 | Jindal et al. ................... 712/27 |
| 6,098,099 A | * | 8/2000 | Ellesson et al. ............. 709/223 |
| 6,154,738 A | * | 11/2000 | Call ................................ 707/4 |
| 6,205,214 B1 | * | 3/2001 | Culli et al. ............. 379/220.01 |
| 6,230,012 B1 | | 5/2001 | Willkie et al. .............. 455/435 |
| 6,301,609 B1 | * | 10/2001 | Aravamudan et al. ...... 709/207 |
| 6,301,617 B1 | | 10/2001 | Carr ............................ 709/227 |
| 6,304,913 B1 | | 10/2001 | Rune .......................... 709/241 |
| 6,314,465 B1 | * | 11/2001 | Paul et al. ................... 709/226 |
| 6,324,580 B1 | * | 11/2001 | Jindal et al. ................ 709/228 |
| 6,330,602 B1 | | 12/2001 | Law et al. ................... 709/224 |
| 6,332,158 B1 | | 12/2001 | Risley et al. ............... 709/219 |

(Continued)

FOREIGN PATENT DOCUMENTS

WO    WO 98/26381    12/1997    ............ G07F 7/10

(Continued)

OTHER PUBLICATIONS

Adaptive Scheduling with Client Resources to Improve WWW . . . —Andresen, Yang (1996); www.cs.ucsb.edu/TRs/techreports/TRCS96-27.ps.*

(Continued)

Primary Examiner—Thong Vu
(74) Attorney, Agent, or Firm—Baker Botts L.L.P.

(57) ABSTRACT

An information service provider network includes a content gateway to process requests for information from a client terminal. The content gateway includes a router for receiving a request for information from the client terminal. The request includes a domain name and additional content. The router forwards the request according to the domain name to a selected one of a plurality of processors to further process the request. The selected one of the plurality of processors identifies an information source to satisfy the request in response to the additional content of the request.

10 Claims, 7 Drawing Sheets

U.S. PATENT DOCUMENTS

| | | | |
|---|---|---|---|
| 6,389,462 B1 * | 5/2002 | Cohen et al. | 709/218 |
| 6,396,833 B1 | 5/2002 | Zhang et al. | 370/392 |
| 6,415,323 B1 * | 7/2002 | McCanne et al. | 709/225 |
| 6,459,682 B1 * | 10/2002 | Ellesson et al. | 370/235 |
| 6,466,977 B1 | 10/2002 | Sitaraman et al. | 709/225 |
| 6,502,131 B1 * | 12/2002 | Vaid et al. | 709/224 |
| 6,512,916 B1 * | 1/2003 | Forbes, Jr. | 455/67.16 |
| 6,516,350 B1 | 2/2003 | Lumelsky et al. | 709/226 |
| 6,560,648 B1 | 5/2003 | Dunn et al. | 709/224 |
| 6,564,243 B1 * | 5/2003 | Yedidia et al. | 709/203 |
| 6,578,066 B1 | 6/2003 | Logan et al. | 709/105 |
| 6,587,928 B1 * | 7/2003 | Periyannan et al. | 711/138 |
| 6,591,266 B1 * | 7/2003 | Li et al. | 707/10 |
| 6,591,295 B1 * | 7/2003 | Diamond et al. | 709/217 |
| 6,594,268 B1 * | 7/2003 | Aukia et al. | 370/400 |
| 6,598,071 B1 | 7/2003 | Hayashi et al. | 709/203 |
| 6,611,590 B1 * | 8/2003 | Lu et al. | 379/265.09 |
| 6,650,998 B1 * | 11/2003 | Rutledge et al. | 701/211 |
| 6,665,702 B1 * | 12/2003 | Zisapel et al. | 718/105 |
| 6,711,607 B1 | 3/2004 | Goyal | 709/203 |
| 6,741,841 B1 * | 5/2004 | Mitchell | 455/188.1 |
| 6,742,044 B1 | 5/2004 | Aviani et al. | 709/235 |
| 6,747,675 B1 * | 6/2004 | Abbott et al. | 345/740 |
| 6,748,569 B1 * | 6/2004 | Brooke et al. | 715/523 |
| 6,754,699 B2 | 6/2004 | Swildens et al. | 709/217 |
| 6,772,214 B1 * | 8/2004 | McClain et al. | 709/229 |
| 6,785,704 B1 * | 8/2004 | McCanne | 718/105 |
| 6,799,214 B1 * | 9/2004 | Li | 709/226 |
| 6,810,411 B1 * | 10/2004 | Coughlin et al. | 709/203 |
| 6,820,085 B2 * | 11/2004 | Nishizawa et al. | 707/10 |
| 6,829,654 B1 * | 12/2004 | Jungck | 709/246 |
| 6,856,991 B1 * | 2/2005 | Srivastava | 707/10 |
| 6,857,012 B2 * | 2/2005 | Sim et al. | 709/222 |
| 6,910,074 B1 * | 6/2005 | Amin et al. | 709/227 |
| 2002/0059114 A1 | 5/2002 | Cockrill et al. | 705/27 |

FOREIGN PATENT DOCUMENTS

| | | | | |
|---|---|---|---|---|
| WO | WO 99/31610 | 12/1998 | | G06F 17/60 |

OTHER PUBLICATIONS

DNS NSAP RPs—Manning, Colella (1992); ftp.sesqui.net/pub/papers/dnsrfc.ps.Z.*

Dynamic Load Balancing in Geographically Distributed . . . —Colajanni, Yu.. (1998); russell.ce.uniroma2.it/dws/icdcs98.ps.*

Locating Nearby Copies of Replicated Internet Servers—Guyton, Schwartz (1995) skwww.enc.iis.sinica.edu.tw/papers/r//ReplSvrLoc.ps.*

Geographic Load Balancing for Scalable Distributed Web . . . —Cardellini, Colajanni, Yu (2000) www.ce.uniroma2.it/dws/mascots00.ps.*

The Design and Performance Evaluation of Alternative XML Storage . . . —Tian, al. (2000) www.cs.wisc.edu/niagara/papers/xmlstore.pdf.*

A Typology for Ready Reference Web Sites in Libraries, and What It Can Tell www.firstmonday.org/ISSUES/issue3_5/sowards.*

Performance Evaluation of Redirection Schemes in . . . —Kangasharju, Ross.. (2000) nibbler.tk.informatik.tu-darmstadt.de/publications/2000/wcw5-redir.pdf.*

Transcoding Internet Content For Heterogeneous Client Devices—Smith, Mohan, Li (1998)www.ee.columbia.edu/~jrsmith/html/pubs/iscas98.pdf.*

Collaborative Proxy System for Distributed Web Content . . . —Cardellini, Yu, al. (2000) www.ce.uniroma2.it/SelectedPublications/cikm00.ps.*

A Technique for User Specific Request—Redirection In Content research.microsoft.com/-pablo/papers/user-redir.pdf.*

Some Web Object MOdel Construction Technologies. Manola, 1998 www.objs.com/OSA/wom-II.htm.*

Encina Administration Guide vol. 3: Advanced Administration www.umiacs.umd.edu/~hu/jhu/DOCS/TX4.2/html/aetga3/aetga315.htm.*

Netscape Directory Server Gateway Customization Guide: Setting Up the Gateway library.nOi.net/netscape/directory/ne-sic/setup.htm.*

* cited by examiner

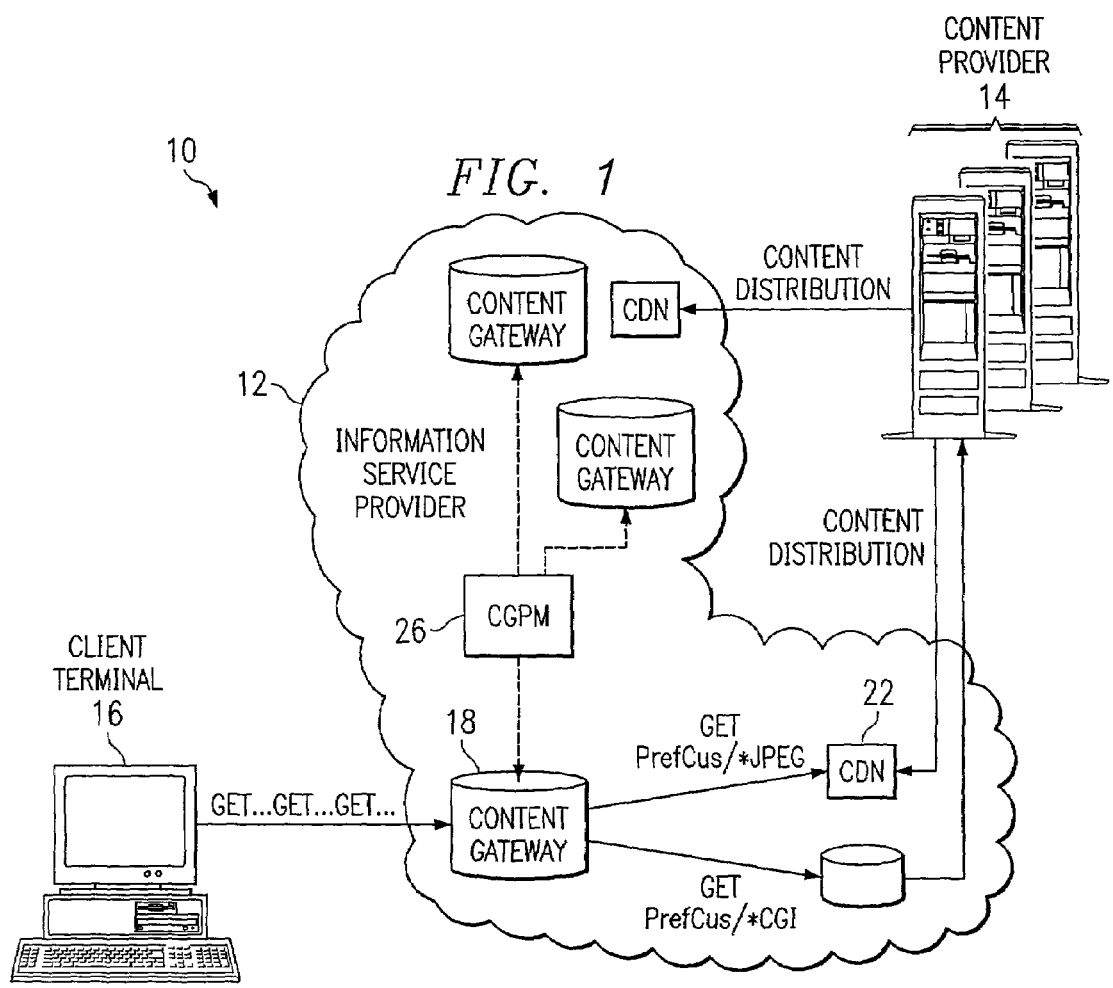
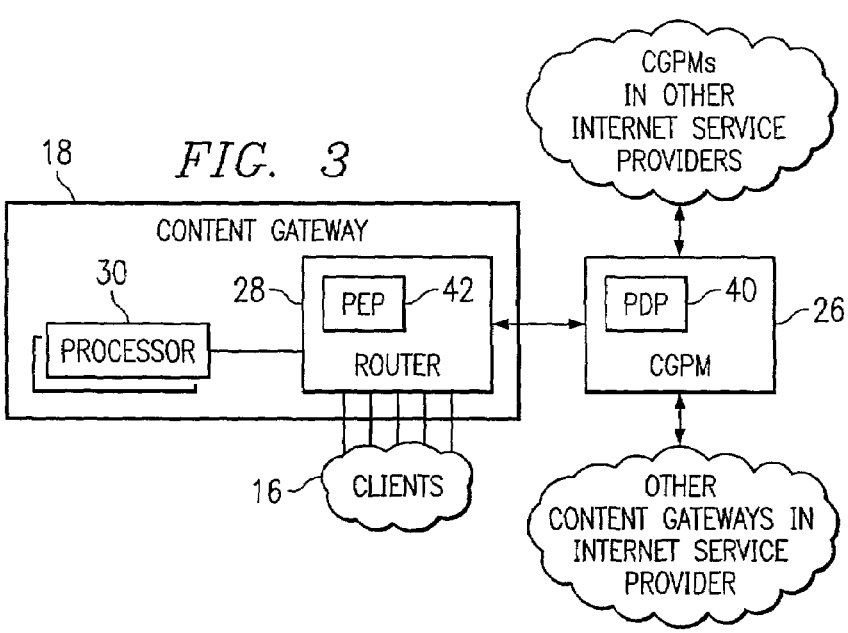

DSCP FIELD

EXPEDITED FORWARDING — 101110XX
ASSURED FORWARDING —

| CLASSES | | DROP PRECEDENCE | |
|---|---|---|---|
| AF1 | 001 | 010 | LOW |
| AF2 | 010 | 100 | MEDIUM |
| AF3 | 011 | 110 | HIGH |
| AF4 | 100 | | |

# SYSTEM AND METHOD FOR PROCESSING A REQUEST FOR INFORMATION IN A NETWORK

TECHNICAL FIELD OF THE INVENTION

The present invention relates in general to Internet information retrieval processing and more particularly to a system and method for processing a request for information in a network.

BACKGROUND OF THE INVENTION

Routing technology has evolved from simple L3 routing based on destination Internet Protocol (IP) address to L4/L5 routing based on source/destination IP addresses, port numbers, and protocol type. Recently, routing has been based on the information request itself. To date, content routing functions are typically located in the proximity of the servers or data centers with routing approaches that consider only the domain name of the information request. With distributed data centers and object replication, it is often possible to retrieve an object to satisfy an information request from multiple servers that are geographically dispersed. Moreover, the desired content may not be located at the closest server. Thus, inefficiencies result when an object is downloaded from a server that is far away from the request originator or is overloaded. This difficulty is further exacerbated when a request is sent to one server only to have it redirected to another server. Therefore, efficiencies and response time improvement can be gained if the best server can be determined at the edge of the network.

SUMMARY OF THE INVENTION

From the foregoing, it may be appreciated by those skilled in the art that a need has arisen for a system and technique that can locate an appropriate server to fulfill an information request by using only the contents of the request. In accordance with the present invention, a system and method for processing a request for information in a network are provided that substantially eliminate or greatly reduce disadvantages and problems associated with conventional content routing techniques.

According to an embodiment of the present invention, there is provided a system node for processing a request for information that includes a router to receive a request for information. The request includes a domain name and additional content. The router forwards the request to a selected one of a plurality of processors according to the domain name associated with the request. The selected processor identifies an information source to fulfill the request according to the additional content of the request.

The present invention provides various technical advantages over conventional content routing techniques which may or may not be required to practice the claimed invention. For example, one technical advantage is to determine a source of information based on the additional content of a request apart from the domain name associated therewith. Another technical advantage is to provide a subscription service to content providers so that associated requests may have accelerated processing. Yet another technical advantage is to locate an efficient server capable of satisfying the request and provide a connection thereto for retrieval of requested information. Still another technical advantage is to avoid penalizing traffic that does not have a subscription for accelerated processing. Other technical advantages may be readily ascertainable by those skilled in the art from the following figures, description, and claims.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which:

FIG. 1 illustrates a block diagram of an information service provider network;

FIG. 3 illustrates a block diagram of a content gateway in the information service provider network;

DETAILED DESCRIPTION OF THE INVENTION

Content Gateway

Figure 2:
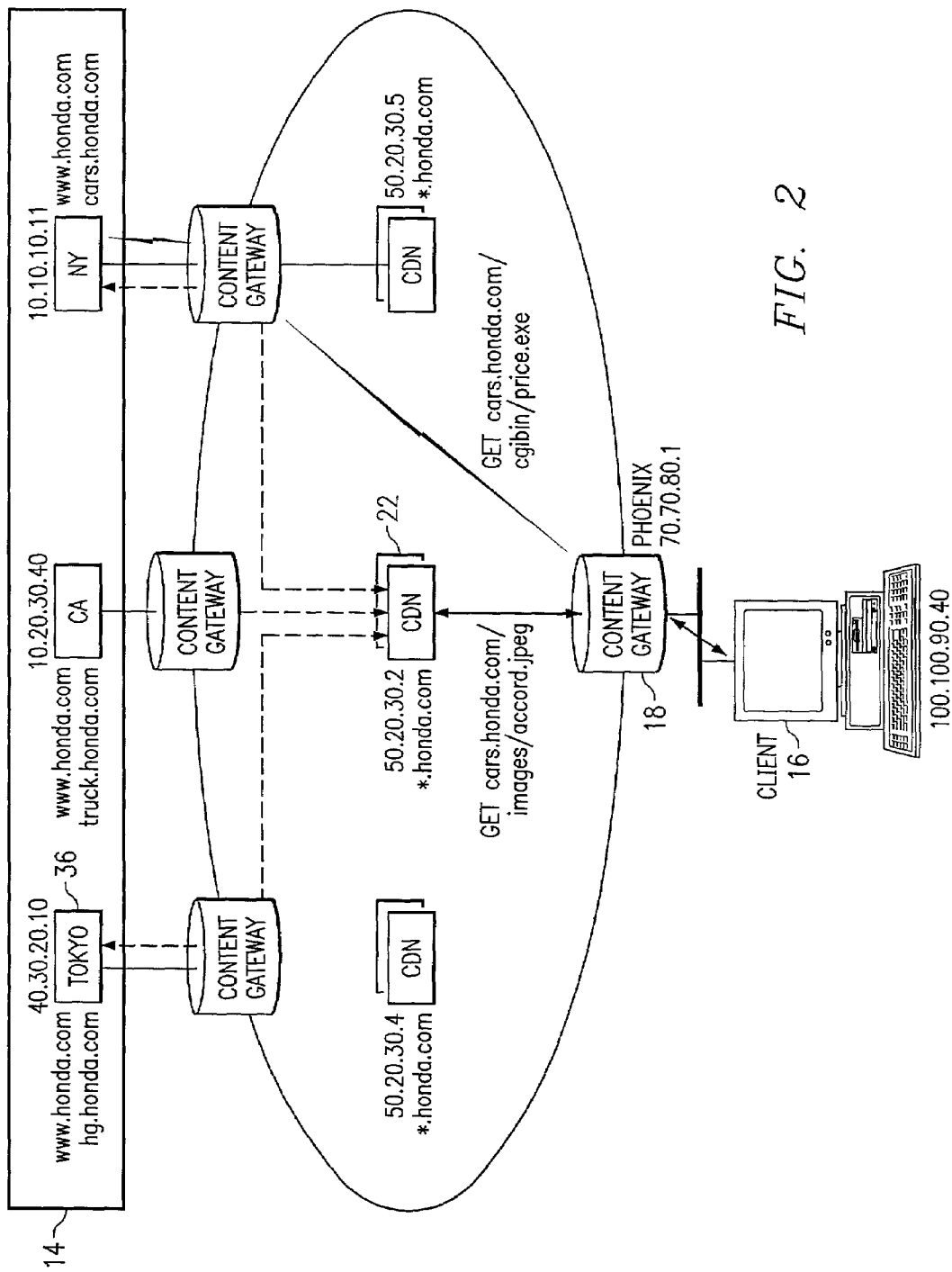
FIG. 2 illustrates a flow chart showing the process of routing information in the internet service provider network.

FIG. 1 is a block diagram of a request content processing network 10. Request content processing network 10 includes one or more information service providers 12 that provide information from a content provider 14 in response to requests from one or more client terminals 16. Information service provider 12 includes one or more content gateways 18 that interface client terminals 16 with content providers 14 in response to policies provided by a content gateway policy manager 26. Content gateways 18 distribute information from content providers 14 either directly or through content delivery nodes 22 to client terminals 16 according to content gateway policy manager 26. Content gateway policy manager 26 is a management node in information service provider 12 that serves as a repository for content policies and communicates with content gateways 18 to distribute content policies within information service provider 12 and exchange policies with other content gateway policy managers in other information service providers.

Content gateway 18 provides a routing and processing function at an edge of request content processing network 10. Content gateway 18 represents a point of presence so that client terminals 16 can obtain information from content provider 14. At the client terminal end, content gateway 18 may connect to access routers fed by local area networks with multiple client terminals 16. Also, wireless client terminals may be attached to content gateway 18 through various wireless controllers. Content gateway 18 provides a value added service at information service provider 12 points of presence for subscribed content providers 14. Content gateway 18 selects the appropriate server at content provider 14 that can deliver the content with an acceptable response time. Content gateway 18 also services requests that traverse more than one information service provider 12.

A content provider 14 may have contracts with more than one information service provider 12 or different information service providers 12 may have contracts with each other to facilitate one information service provider 12 honoring service level agreements for another information service provider 12 subscribed content provider 14. Content gateway 18 ensures that requests are executed according to policies that maximize performance for the subscribed content provider 14 and yet do not violate the collection of contracts that are in effect.

Content gateway 18 intercepts request that are candidates for content processing, classifies requests by examining the content of the request, makes routing decisions based on the content of the request, and determines an appropriate content provider 14 server location to satisfy the request including location of servers in the best proximity to the client terminal 16. Content gateway 18 establishes a connection with the selected destination server or other content gateways having the characteristics specified by the associated classification policy and forwards the request over the allocated connection. Content gateway 18 participates in a policy distribution network to receive and install content policies and supports content peering in order to direct requests to content gateways or content delivery nodes in other information service providers 12. Content gateway 18 also collects billing and accounting records that capture volume of content processed by content provider, home and affiliate information service providers 12, and content policy rule.

To avoid obtaining information from a far away, overloaded, or redirected server, content gateway 18 learns about the distribution of information so that a request can be directed to a server that can deliver the requested information in a direct and efficient manner. In some cases, the request may be directed to a local content delivery node, proxy cache, or replication server that contains a replica of the information requested. Content gateway 18 extends the routing concept to include the content of the request.

FIG. 2 is a flow chart illustrating steps in the process of routing information in information service provider 12. As illustrated in FIG. 2, client terminal 16 located in Phoenix makes a request to www.honda.com. Initially, a domain name server request is issued from client terminal 16 to determine if the associated domain name merits enhanced propagation through request content processing network 10. If the domain name is subscribed for content gateway services, the IP address of content gateway 18 is returned. Subsequently, client terminal 16 makes a connection with content gateway 18 and sends the request accordingly. Content gateway 18 intercepts the request and parses the uniform resource locator and the HTTP headers.

At this point, the objective of content gateway 18 is to locate the "best" server and network connection for delivering data to client terminal 16, i.e., the server that will deliver the content the fastest with the required security protection. Determining the best server depends on various factors including whether the internet service provider implements a content delivering nodes, whether the content requested is static or dynamic, whether the content is replicated in different data centers or at the content delivery nodes, and which of the eligible servers are most heavily loaded.

In the example illustrated in FIG. 2, information service provider 12 uses content delivery nodes 22 to propagate static content for subscribed content providers 14 closer to client terminals 16. Content delivery nodes 22 cache static content (potentially on demand) for all domains for Honda. Content gateway 18 provides a domain name system proxy function that guarantees location of content delivery nodes 22 or content provider 14 servers close to client terminal 16. This would also be true if there exists a local domain name server near client terminal 16. Some information service providers 12 may also centralize their domain name system servers for better manageability.

In the example illustrated in FIG. 2, if the content provider 14 servers for Honda were located in New York and content gateway 18 did not exist, information service provider 12 may locate content delivery node 22 with address 50.20.30.5, which is a substantial distance from client terminal 16 in Phoenix. In the example illustrated in FIG. 2, content delivery node 22 with address 50.20.30.2, located in Los Angeles, is returned using content gateway 18. Once the IP address of a content delivery node 22 is determined, content gateway 18 is able to recall this information for a prescribed time.

In the example illustrated in FIG. 2, it is presumed that a starting web page is retrieved from www.honda.com. This page can be retrieved from any data center and cached at all the content delivery nodes 22. Client terminal 16 issues a domain name system request to content gateway 18 and the IP address of the delivery node 50.20.30.2 is eventually returned to content gateway 18. With this in place, content gateway 18 may now fill in the server field for the content class that matches www.honda.com. Content gateway 18 returns its IP address 70.70.80.1 as the initial domain name system response. Client terminal 16 connects to content gateway 18 and forwards the request. Content gateway 18 connects to content delivery node 22 with address 50.20.30.2, receives the page for www.honda.com, and returns it to client terminal 16. After the www.honda.com page is displayed, client terminal 16 may trigger a request for a car image such as acura.jpeg at cars.honda.com. Again, the domain name system request from client terminal 16 is intercepted by content gateway 18 and the IP address of content gateway 18 is returned to client terminal 16. At this point, client terminal 16 connects to content gateway 18 and sends the "GET" request for cars.honda.com/images/acura.jpeg. At this point, content gateway 18 consults an associated policy for the URL and a content gateway directory and recognizes the server IP address is present. This is a consequence of a policy that indicates static hypertext transfer mark-up language (HTML) and JPEG objects reside on the same content server. Consequently, content gateway 18 may connect immediately to the content delivery node 22 with address 50.20.30.2 to retrieve acura.jpeg.

Because content gateway 18 parses the URL request, it may immediately recognize whether or not the response is cacheable. As illustrated in FIG. 2, a dynamic request "GET" cars.honda.com/cgibin/price.exe is issued. Content gateway 18 consults the content gateway directory and routes the request to the specified server which happens to be the origin server. The origin IP address may be configured as part of the content policy or learned indirectly from previous domain name server query processing operations.

An important advantage of content gateway 18 is essentially control. This is because different traffic policies and differentiated services may be signaled to content gateway 18 causing, for example, packets between content gateway 18 and the origin server to receive high priority. Content gateway 18 implements much of the content inspection logic and performs additional logic so that most of the traffic is routed at the layer 2/layer 3 level. Alternatively, if the internet service provider does not support content delivery nodes 22, content gateway 18 may provide a large improvement in performance since redirection overhead may be avoided completely. For example, if in FIG. 2, no content delivery nodes 22 are present and information resources reside only at the New York content provider 14, then the request for cars.honda.com/images/acura.jpeg may initially be routed to 10.20.30.40. The request would then subsequently be redirected to 10.10.10.11. Content gateway 18 may dynamically learn or be configured to know the origin servers for all of the content classes. In addition, as data is duplicated over several content providers 14, relatively infrequent probes may be sent out by content gateway 18 to determine patterns based on preferred choices. This may be particularly significant in the presence of transparent caches.

As illustrated in FIG. 2, another important advantage of the present invention is that requests meriting standard processing are not effected by the subscribed enhanced processing capabilities. Connections for a request that are not for subscribed content providers 14 are not terminated at content gateway 18, and therefore, are not subject to any content routing overhead. Connections for requests sent to subscribed content providers 14 are terminated at content gateway 18 so that the request content may be classified. Content gateway 18 is intended to accelerate both static objects (e.g., graphics, HTML text files, etc.) and dynamic objects that are generated by an executable program. While it is possible that dynamic objects may be retrieved from multiple locations, it is less likely for this to occur because their creation (via program execution) is frequently dependent on a non-replicated database.

FIG. 3 shows a block diagram of content gateway 18. Content gateway 18 is a composite node that includes a content gateway router 28 and one or more content gateway processors 30. Content gateway router 28 is an edge-router that operates to direct a request within request content processing network 10 toward a destination. While described as an edge-router, the present invention contemplates that content gateway router 28 may be any other suitable device capable of directing information in request content processing network 10. Content gateway router 28 serves as a point of presence within information service provider 12. Content gateway router 28 contains the interfaces that attach content gateway 18 to the backbone of request content processing network 10 and also includes the connections that aggregate client traffic. Content gateway router 28 may be connected to local area networks that attach to client terminals 16, enterprise servers, or server farms. Content gateway router 28 may receive a request from a browser associated with client terminal 16 and communicate the request to a pathway leading to its proper destination. Content gateway router 28 is capable of directing a series of requests that it receives from client terminal 16. The routing of the request received by content gateway router 28 may be based on information carried by the request. Content gateway router 28 transmits information, via packets in a transmission-controlled protocol (TCP) format. Where appropriate, content gateway router 28 directs a request to an appropriate content gateway processor 30.

Content gateway processor 30 includes a separate processing system optimized for processing content or other suitable data in request content processing network 10. Content gateway processor 30 is the processing system that generally executes content routing L7 functions. Content gateway processor 30 is connected to content gateway router 28 via a fast high capacity connection (e.g., gigabit Ethernet). Content gateway processor 30 may also be installed as a card within content gateway router 28. In general, there may be more than one content gateway processor 30 to provide redundancy, fail over characteristics, and extra capacity for request content processing network 10.

Content gateway processor 30 communicates with content gateway router 28 and with any information source in request content processing network 10 in order to retrieve information associated with the request. Additionally, content gateway processor 30 may communicate with a series of additional processors which all may communicate with content gateway router 28. Content gateway processor 30 may receive information from an application/content/data provider 14 or content delivery node 22 within request content processing network 10, or from any other data source in response to a request that is provided at client terminal 16 and communicated through content gateway router 28.

In one embodiment of the present invention, the internet protocol (IP) address of content gateway processor 30 is communicated to content gateway router 28 in response to a request from client terminal 16. The communication of the request through the network is facilitated by a content gateway directory 32 within content gateway processor 30. Appropriate content policy is kept in content gateway directory 32 in a memory space of the content gateway processor 30. Content gateway directory 32 is used to resolve the requests to the best server location. Content gateway directory 32 includes a content class that consists of a template and a set of rules for pattern matching the uniform resource locator (URL) of the request and, in accordance with one embodiment, the hyper text transfer protocol (HTTP) headers. If a match is found, the transport rules are used to establish a connection to a content location. The transport rules consist of a set of differentiated service (or quality of service) flags as defined by the proprietary values, a policy based routing identifier, and a set of rules for determining the optimal server (defined as producing the quickest response time to the request with the required security protection) to deliver the content associated with the request. These rules may be a list of server IP addresses and/or an indication that an ADNS server is to be invoked to resolve the request domain name.

Content gateway directory 32 codifies a policy for content based routing. Content gateway directory 32 includes a classification policy and a processing policy. The classification policy defines the pattern or template used to match the domain name and additional content of the request from client terminal 16. If all parts of the request match a pattern or template in the classification policy, then the request is classified for processing by an associated processing policy. The processing policy includes the processing actions for the request to include identification of a source of information to satisfy the request. Appendix A shows an example configuration of content gateway directory 32.

An important function of content gateway 18 is to avoid penalizing traffic that is not subject to content routing where content provider 14 has not subscribed to such service. Non-subscription traffic is routed directly by content gateway router 28, bypassing content gateway processor 30, toward a destination content provider 14 with no extra overhead due to the presence of the content routing capability. The processing of requests during content aware processing thus involves two steps. First, by inspecting DNS queries, the request traffic is qualified by domain name to determine if it should be routed to a content gateway processor 30. Second, if the request traffic qualifies for content processing, it is routed to an appropriate content gateway processor 30 where the content of the request is processed.

In processing a request in request content processing network 10, content gateway processor 30 cooperates with content gateway policy manager 26. Content gateway policy manager 26 is introduced into the content gateway architecture in order to define a policy server for the distribution of classification and processing policies to additional content gateways 18. When content gateway 18 is initiated, it may register with an associated content gateway policy manager 26. A policy distribution point responsible for distributing policies to other network elements is connected to content gateway policy manager 26 and may send policy updates to other content gateways 18 and content gateway policy managers 26 as appropriate. Content gateway policy manager 26 also facilitates the distribution of content policies to additional content gateway policy managers 26. Content gateway policy manager 26 includes a Policy Distribution Point (PDP) 40 to handle distribution of policies throughout request content processing network 10. Content gateway router 28 includes a Policy Enforcement Point 42 that receives policy from PDP 40 for installation and subsequent enforcement. Content gateway policy manager 26 also supports the exchange of policies with other affiliated information service providers 12. This allows, for example, replicated content in one information service provider 12 environment to be accessed by a content gateway 18 in another information service provider 12 environment. Policy exchanges between information service providers 12 is based on service level agreements among the information service providers 12 and content providers 14 with the common open policy service (COPS) protocol (or equivalent protocols including XML) being used for communications.

Content gateway policy manager 26 may communicate with its peers to distribute policy information for multiple information service providers 12 to the edges of request content processing network 10 so that requests can be routed directly to the optimal server or servers. This feature eliminates the need for content inspection in the core of request content processing network 10 and the associated overhead that would significantly reduce traffic throughput. Content gateway policy manager 26 also contains a persistent repository for large sets of content policy data for its own information service provider 12 and affiliated information service providers 12 resulting from policy exchanges. This repository can contain more content policy data than could be contained in the real memory stored in content gateway 18. Using content gateway policy manager 26, content policy can be downloaded to content gateway 18 on demand using a policy replacement algorithm for cases where the content gateway memory is full. Internet service provider policy distribution is subject to policies that dictate authentication, authorization, and accounting requirements, and transport policy negotiation.

Domain Name Qualification

Figure 4:
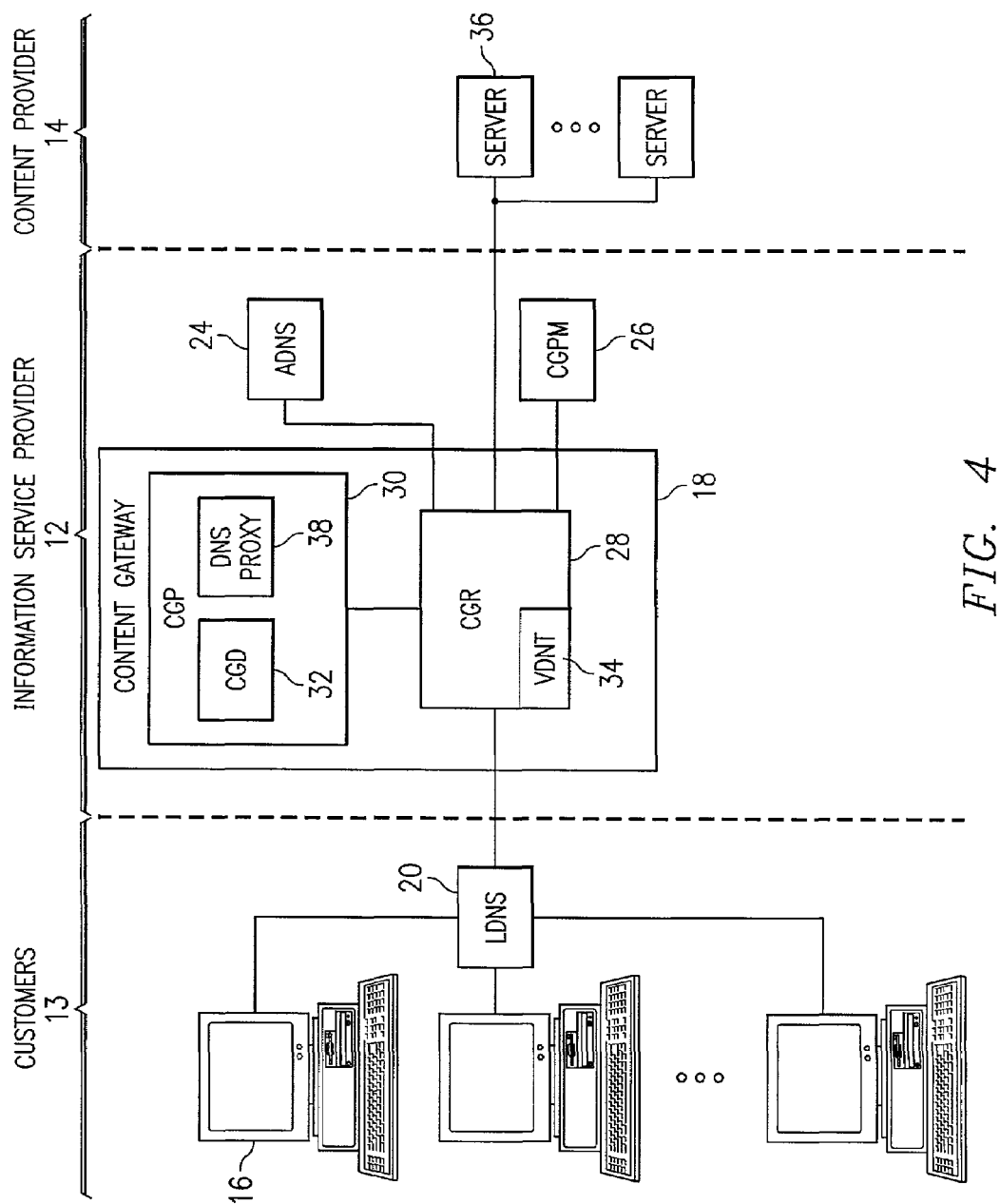
FIG. 4 illustrates a functional block diagram of the information service provider network.

FIG. 4 is a block diagram of another request content processing network 10. Request content processing network 10 includes a customer network 13, an information service provider 12, and a content provider 14. Customer network 13 includes one or more client terminals 16 and a local domain name server 20. Client terminals 16 send out queries for processing by local domain name server 20. Client terminals 16 may be individual users, application service providers, other information service providers, enterprises that pay information service providers for networking services, or any entity that subscribes to information service provider services. If the local domain name server 20 has an entry for the request, the entry is forwarded to the requesting client terminal 16. If the local domain name server 20 does not have an entry for the request, the request is forwarded to information service provider 12 for processing. Information service provider 12 will return an Internet Protocol (IP) address to the client through local domain name server 20 in order to establish a connection with a server identified by the IP address in order to process the content of the request. Local domain name server 20 may include a database which can be updated upon the return of the IP address from information service provider 12 so that subsequent requests for the same domain name can be initially handled directly by local domain name server 20.

Information service provider 12 includes a content gateway 18, an authoritative domain name server 24, and a content gateway policy manager 26. Content gateway 18 is a composite node that includes a content gateway router 28 and one or more content gateway processors 30. Content gateway router 28 is a network edge router that contains interfaces to attach content gateway 18 to the backbone network and the connections that aggregate customer traffic. Content gateway processors 30 provide the processing system to execute content routing functions. Content gateway policy manager 26 communicates with peer managers to distribute content policy information to content gateways 18 for multiple information service providers 12 to the edges of the network so that requests can be routed directly to the best server using the appropriate network transmission service. Content policy may be downloaded to content gateways 18 from content gateway policy manager 26. Authoritative domain name server 24 provides appropriate IP addresses to handle requests when neither local domain name server 20 nor content gateway 18 have entries for those requests. Local domain name server 20 and authoritative domain name server 24 are TCP/IP architected distributed servers that resolve an Internet domain name to an Internet IP address and an IP address to a domain name.

Figure 5:
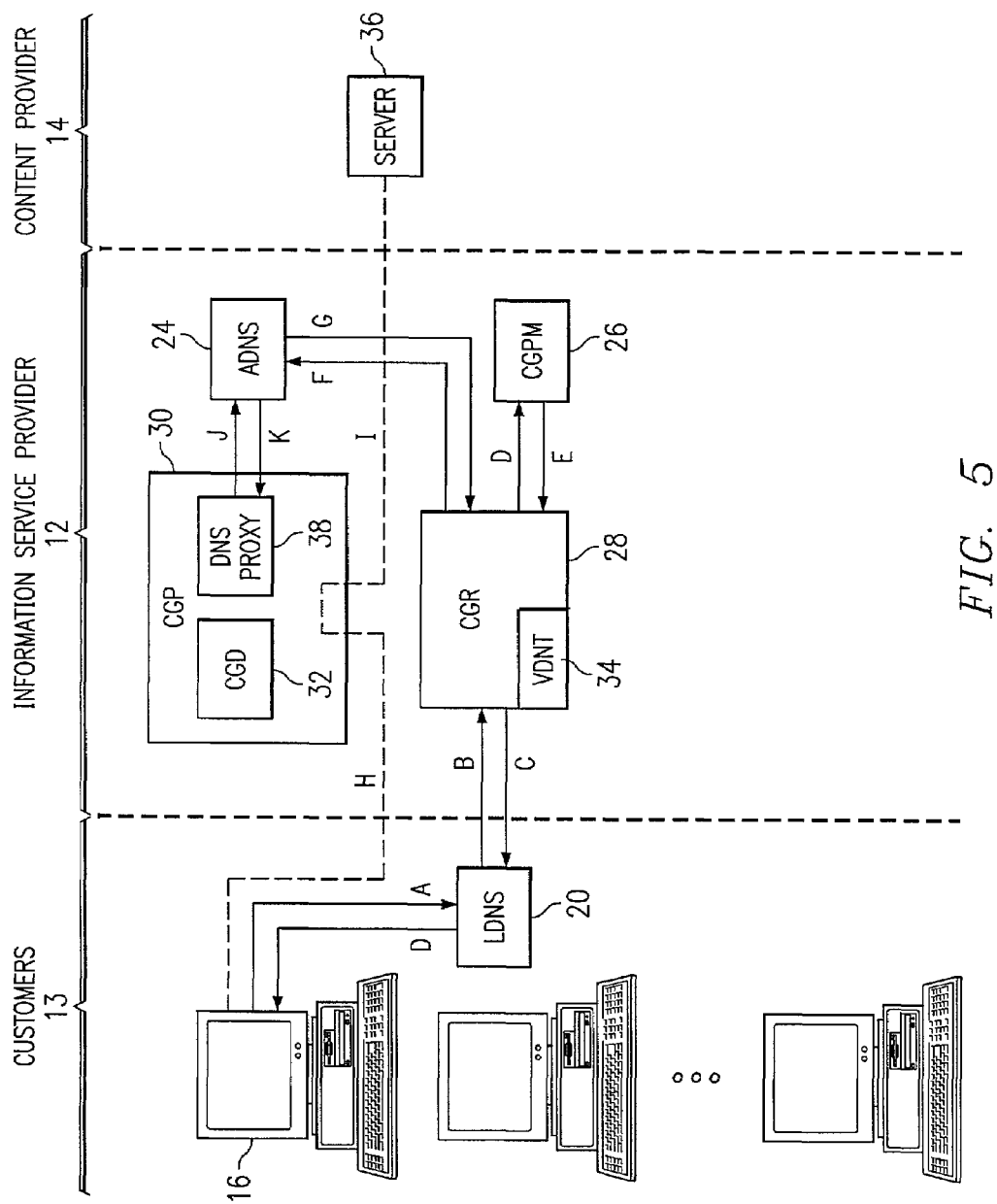
FIG. 5 illustrates an operational flow diagram of the information service provider network.

FIG. 5 shows an example operation of content gateway 18. Initially, a browser in client terminal 16 issues either a request for information or a domain name server query along path A for some domain. Individual customer terminals directly or indirectly reference local domain name server 20 supplied by their information service provider 12. Though shown outside of information service provider 12, client terminals 16 may reference a local or authoritative domain name server 24 within information service provider 12 depending on the configuration of the network. In this situation, a domain name server query is generated and issued by client terminal 16. Thus, for some networks, there may not be a local domain name server 20 outside of information service provider 12. Normally, local domain name server 20 may not include an entry to handle the request from client terminal 16 but does contain resource records for resources outside of its domain that reference authoritative domain name server 24. In such a situation, a domain name server query is generated from the request and routed along path B towards authoritative domain name server 24 in information service provider 12. Without the presence of local domain name server 20, the query goes directly from client terminal 16 to information service provider 12 along path B according to client terminal 16 being configured to reference a local or authoritative domain name server therein.

Content gateway 18 includes an intercept function within content gateway router 28 to capture queries to authoritative domain name server 24. Content gateway router 28 includes a valid domain name table 34 that references a domain name with an IP address of an associated content gateway processor 30 that will perform content routing of the query. When content gateway router 28 receives a domain name server query from path B, the valid domain name table 34 is searched for the domain name of the query. If the domain name of the query is found in valid domain name table 34, the IP address of the associated content gateway processor 30 is returned as the domain name server response to the query along path C. The IP address of the associated content gateway processor is returned to client terminal 16 along path D through local domain name server 20 if present. Local domain name server 20 may update its database with the IP address of the associated content gateway processor 30 so that subsequent requests for that domain name may be handled locally in customer network 13 without repeating the above procedure.

Upon receiving the IP address of the associated content gateway processor 30, client terminal 16 establishes a connection along path H with content gateway processor 30 in order to execute the request. Content gateway processor 30 may connect to a server 36 of content provider 14 along path I according to the content policy for the domain name. Content gateway processor 30 acts as a proxy for client terminal 16. Content gateway processor 30 will select the server that can deliver the requested content in an efficient manner within the policy guidelines of the domain as subscribed to by content provider 14.

If the valid domain name table 34 does not find an IP address match for the domain name of the query, the domain name server query is routed toward the intended authoritative domain name server 24. Authoritative domain name server 24 returns an IP address for server 36 of content provider 14 that is routed back to client terminal 16. Client terminal 16 establishes a connection directly with server 36 along paths H and I that flow through content gateway router 28 without passing through any content gateway processor 30.

Since valid domain name table 34 is relatively small and is not designed to hold every possible domain name that has an associated content policy for execution by a content gateway processor 30, there may be a content policy for a domain name within content gateway policy manager 26. In parallel, the domain name server query is also forwarded to content gateway policy manager 26 along path D. Content gateway policy manager 26 determines if there is a content policy associated with the query. Content gateway policy manager 26 searches its policy database for policy information. If no policy exists, then no action is taken. If a policy exists for the domain, the policy is provided to content gateway router 28 along path E. Content gateway router 28 selects a content gateway processor for the domain, inserts an entry in valid domain name table 34 including the domain name and the IP address of the selected content gateway processor 30, and propagates the policy information to the selected content gateway processor 30. The current request being processed will result in a direct connection between client terminal 16 and server 36. If a policy update is received from content gateway policy manager 26 for this domain, then subsequent requests for this domian will be processed according to the newly installed policy. Policy updates and request processing is performed asynchronously in parallel so that user request traffic throughput is not degraded due to policy information update processing.

Figure 6:
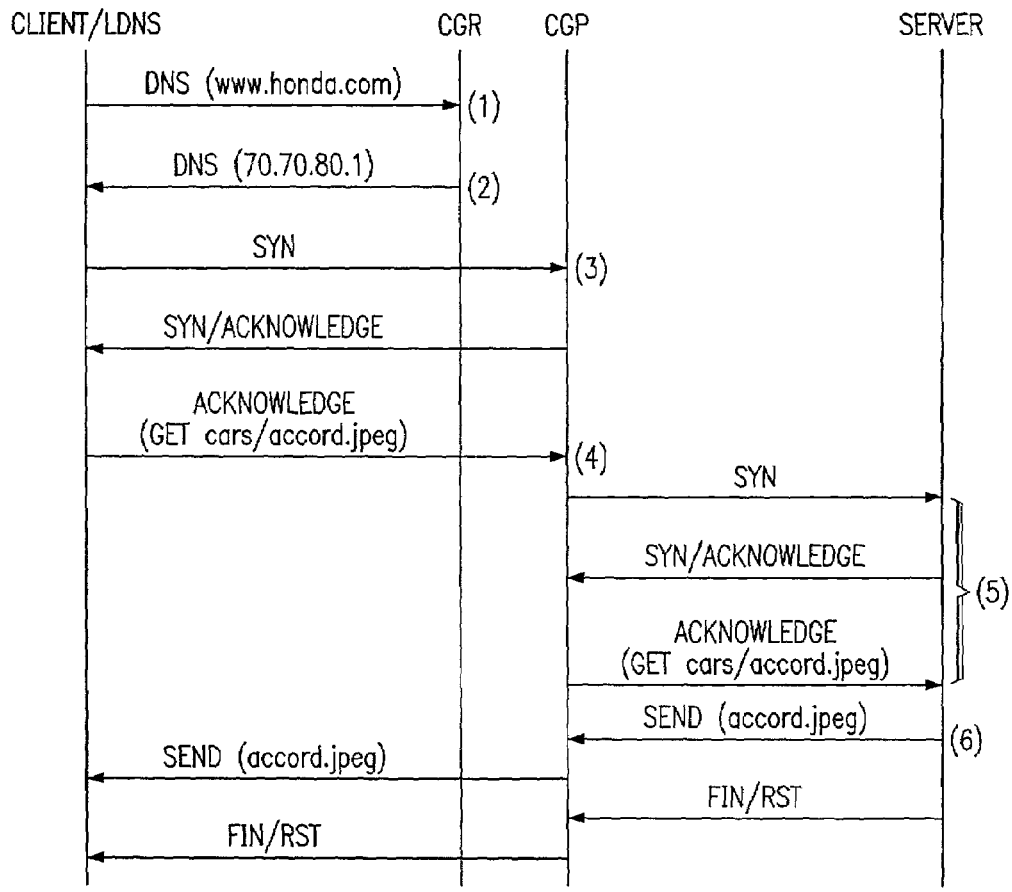
FIG. 6 illustrates an example flow of request processing performed by the content gateway.

FIG. 6 is an example flow of request processing performed by content gateway 18. The request used in the example is http://www.honda.com/cars/accord.jpeg. A domain name server query is generated from the request and sent by client terminal 16, or local domain name server 20 if present, in response to the request from client terminal 16. If there is a local domain name server 20 present, it is assumed that it does not have an entry for the domain name www.honda.com and so forwards the domain name server query to authoritative domain name server 24. Content gateway router 28 intercepts the query (1) and searches valid domain name table (VDNT) 34 for a matching domain name. If there is a match, the domain name is qualified and becomes a candidate for content routing. If the domain name is not qualified, content provider 14 has not subscribed to request acceleration with information service provider 12 and an IP address of an appropriate server is obtained as described earlier to establish the connection with client terminal 16 in order to provide the appropriate content. Content gateway router 28 returns an IP address (2) of an associated content gateway processor 30 from valid domain name table 34 so that the associated content gateway processor 30 can serve as a proxy for client terminal 16 to perform content routing of the request. Client terminal 16 then establishes a connection (3) with the associated content gateway processor 30 in order to execute the request.

Upon establishing the connection, client terminal 16 provides the request (4) to the appropriate content gateway processor 30. Content gateway processor 30 parses the Uniform Resource Locator (URL) of the request for classification. Content gateway processor 30 determines whether there is a policy for the classification of the request. If so, for example the request matches the class cars/*.jpeg, content gateway processor 30 issues setup instructions (5) to route all packets of this flow to the appropriate outbound interface in accordance with the policy for subsequent processing by server 36 of content provider 14. Content gateway processor 30 receives the appropriate content (6) from server 36 and forwards it to client terminal 16. If any modification of packet data is desired, content gateway processor 30 remains as a termination point, or proxy, for the duration of the connection. If no modifications of the packets are necessary, the connection may be unproxied to have a direct connection between client terminal 16 and server 36 for improved efficiency of the traffic during the remainder of the connection.

Though the domain name may be qualified, the request may not have a matching classification in content gateway processor 30. In such a situation, there is no policy for request acceleration. Content gateway processor uses a domain name server proxy 38 to obtain a valid IP address of a server for the domain name. The domain name server proxy provides a query to authoritative domain name server 24 over path J. Authoritative domain name server 24 provides an IP address of an appropriate server to content gateway processor 30 over path K. Content gateway processor establishes a connection with the appropriate server to obtain the requested content. Subsequently, content gateway processor 30 may unproxy the connection so that the remainder of the traffic may be routed directly between client terminal 16 and the appropriate server.

When a domain name is qualified for content processing, content gateway processor 308 terminates the connection with client terminal 16 to receive the request. Using content gateway directory 32, content gateway processor 30 attempts to classify the request by parsing the URL and HTTP headers into its constituent parts, such as application (e.g., http), domain name (e.g., www.honda.com), and object (e.g., images/accord.jpeg). The parsed result is pattern matched against corresponding fields in content gateway directory 32. The matching process proceeds from the most specific to the most general object class until either a match is found or the process fails. If the request is classified, then content gateway processor 30 establishes a connection with the server identified by content gateway directory 32 using the transport policy and server address specified by the processing policy.

In order to ensure that all server responses are returned to content gateway processor 30, the IP address and port number (ip:port) of client terminal 16 is translated to one that identifies content gateway processor 30. Since traffic for many client terminals 16 may be flowing through content gateway processor 30, a client network address translation pool may be used to assign a unique source ip:port per client terminal 16 for outbound packets. On inbound packets, this address is seen as the destination ip:port. This address is used to locate the client connection so that the original client ip:port can be restored as the destination address to forward the packet to client terminal 16.

Some content providers 14 require the source IP address of client terminal 16 be preserved at their servers for logging and accounting purposes. The translation performed by the client network address translation pool would restrict such a preservation capability. To solve this, the client ip:port may be inserted by content gateway processor 30 as a TCP option in the TCP/IP header. Since this option would be ignored by the TCP/IP stack at the receiving server, a translation would be performed prior to the packet reaching the server. The translation may be performed by a server load balancer where the client ip:port is extracted from the TCP/IP option field, the source ip:port (the address inserted by content gateway processor 30 through use of the client network address translation pool) is saved, and inserting the client ip:port in place of the source ip:port before forwarding the packet to the server. For outbound flows, the load balancer would reverse the process by replacing the client ip:port with the saved source ip:port so that the packet would be properly sent to content gateway processor 30.

It is possible that information to satisfy related requests may not be located at the same server. If a request is received from client terminal 16 and its classification results in a destination server different than the current server connection, then a new connection to the new server is established. Rather than immediately de-allocating the current server connection, content gateway processor 30 maintains a connection list for client terminal 16. When a request is received that references a different server, content gateway processor 30 will save the current connection in the connection list. If a connection to the requested server exists in the connection list, content gateway processor 30 will re-establish the connection for client terminal 16 to the requested server according to the saved connection. When the connection list becomes full, the current connection may be saved by removing the least recently used connection in the connection list. In this manner, connections may be quickly re-established in anticipation of additional requests from the same client terminal 16 to the same server without the need to establish the connection from scratch.

Each entry in content gateway directory 32 relates to a set of objects. However, each request deals with a single object, such as acura.jpeg. When the best location to satisfy a request is determined, a principle of generalization is used to assert that this location is also good for satisfying requests with objects of a similar type since similar objects are typically stored at the same location. For example, from FIG. 2, if the best location for retrieving www.honda.com/cars/accord.jpeg is the New York location 10.10.10.11, it is also assumed to be the best location to retrieve www.honda.com/cars/acura.jpeg. The principle of generalization allows for server addresses to be assigned for an entire request class, such as www.honda.com/cars/*.jpeg.

The processing policy for an entry in content gateway directory 32 may specify a list of server addresses that can satisfy the request. If more than one address is specified, it is presumed that the set of objects identified by the classification policy exists at all of the locations. The optimal server may vary according to the location of content gateway 18. When the processing policy is installed, all servers are probed so that the server address list is ordered properly. Probes may be executed periodically from content gateway processor 30 to dynamically improve the ability to find the best server or cache of information. Content gateway processor 30 dynamically learns of best server locations through the use of these probes, discovery of other content delivery nodes for a given class, monitoring of redirect flows, and observance of response flows.

Quality Of Service Policy

There are two classes of policies relevant to content gateway 18, quality of service policies that are downloaded to content gateway router 28 and content policies distributed to content gateway processors 30. Content gateway policy manager 26 is used to distribute content policies to content gateway processors 30 and a separate policy server may be used to distribute quality of service policies to content gateway routers 28. Content gateway policy manager 26 performs a distribution role using a policy distribution point to provide the content policies to content gateways 18. Content gateway router 28 performs an enforcement role using a policy enforcement point to implement content policies provided by content policy manager 26.

Figure 7:
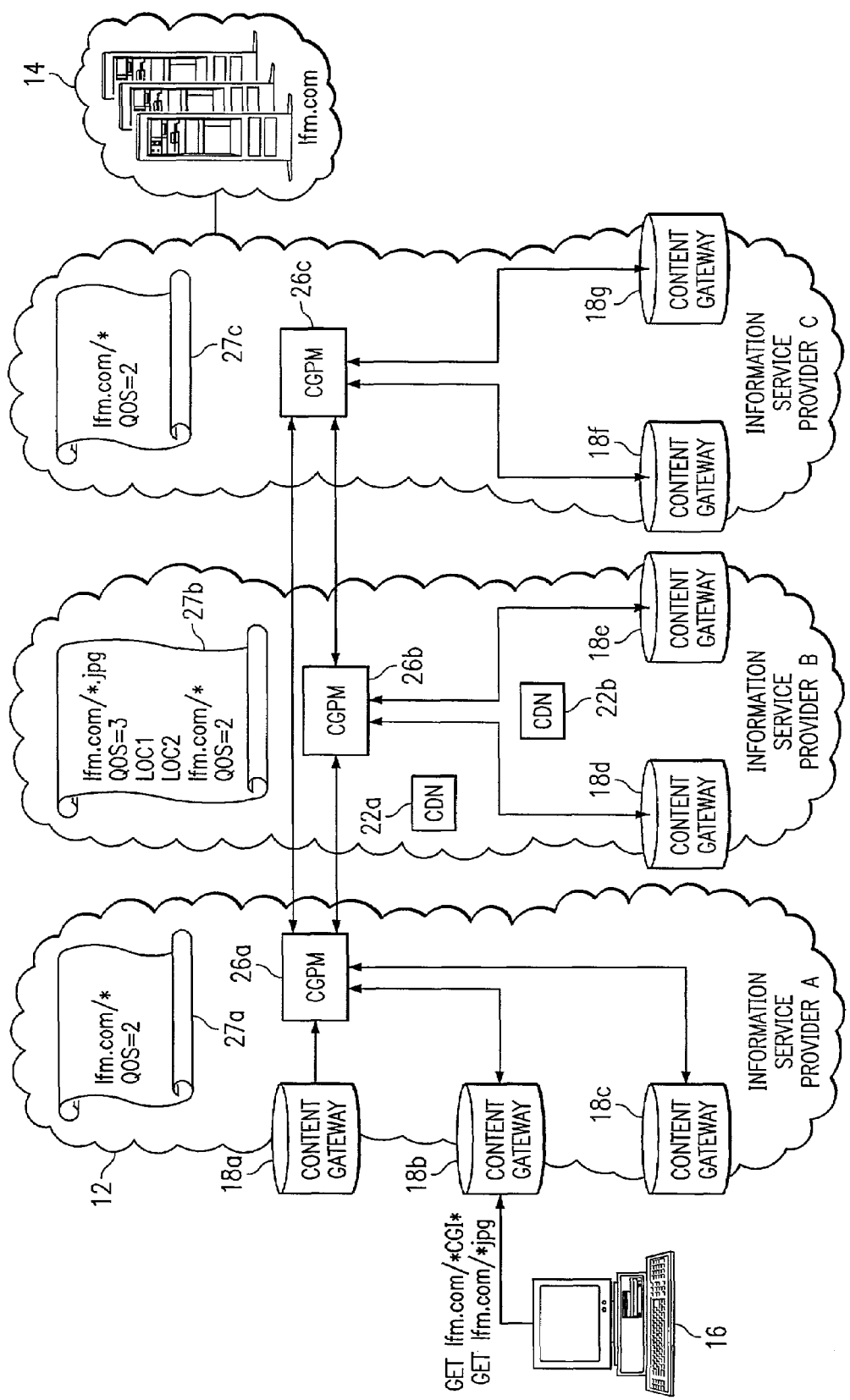
FIG. 7 illustrates a multiple internet service provider network.

FIG. 7 is a block diagram illustrating multiple internet service provider networks (ISP A, ISP B, ISP C) and a set of policy managers 26a, 26b, and 26c. For purposes of example, internet service providers A, B, and C have been illustrated with different agreements or contracts 27a, 27b, and 27c with an exemplary application service or content provider 14 LFM.com. Each content gateway 18a–g has been configured to point to its respective policy manager. Policy managers 26a, 26b, and 26c implement a COPS content policy distribution point.

Initially, each internet service provider's content policy data is installed on a respective policy manager 26a, 26b, or 26c from a policy repository. These policy data are constructed in accordance with agreements 27a, 27b, and 27c with the subscribed content providers (such as application service or content provider 14 LFM.com). Each policy manager 26a, 26b, and 26c is explicitly configured to connect to each other for internet service providers for which there is a contractual agreement to share content policies. For each foreign internet service provider it has a contract with, the policy manager configures the IP address and the security features of the peer policy manager in accordance with the policy service distribution protocol (e.g., COPS).

Policy exchange between policy managers 26a, 26b, and 26c is generally unidirectional; if the agreement is reciprocal then there are two unidirectional exchanges, one in each direction. Policy distribution is performed pairwise, i.e., a policy received by policy manager 26b from policy manager 26a is not automatically propagated to policy manager 26c because policy manager 26b does not know the contractual agreement between internet service providers A and C. Thus, each of policy managers 26a, 26b, and 26c assume the role of policy distribution point or policy enforcement point by communicating with another policy manager, depending on whether it is the distributor or recipient of the policy, respectively. Content policy for individual domains can be downloaded on demand as requests are received from content gateways 18*a–g*. Alternatively, each of content gateways 18*a–g* can request that all policies are downloaded in a batch-like mode (e.g., during startup).

As illustrated in FIG. 7, the policy information for application service or content provider 14, (LFM.com) and each internet service provider A, B, and C is shown in agreements 27*a*, 27*b*, and 27*c*. The policy exchange possibilities between internet service providers A, B, and C for LFM.com are depicted by the double-headed arrows between the policy managers 26*a*, 26*b*, and 26*c*. Generally this would result in a policy merge of all the internet service provider policies. Since the initial policies for internet service provider A and internet service provider C are a subset of the policies of internet service provider B, the end result is that all policy managers connected to internet service provider B in a given network would contain the policies of internet service provider B. System caches 22*a* and 22*b* in internet service provider B are now known to internet service providers A and C. This enables, for example, a joint photographics experts group (JPEG) image request generated at a client terminal 19 (requiring additional processing) to the LFM.com server to be immediately directed to the nearest content delivery node in internet service provider B.

In general, transport policy merges are resolved according to contracts between internet service providers A, B, and C and application service provider 23. For example, as illustrated in FIG. 7, if internet service provider B offers a quality of service equal to level three, and internet service provider A contracted with LFM.com for a quality of service having a level of two, internet service provider A may use a quality of service of level three if internet service provider B has an agreement with internet service provider A or LFM.com 14 to promote the quality of service identified. Such contracts would presumably have commensurate billing implications among internet service providers and content providers to recover the incurred costs.

Figure 8:
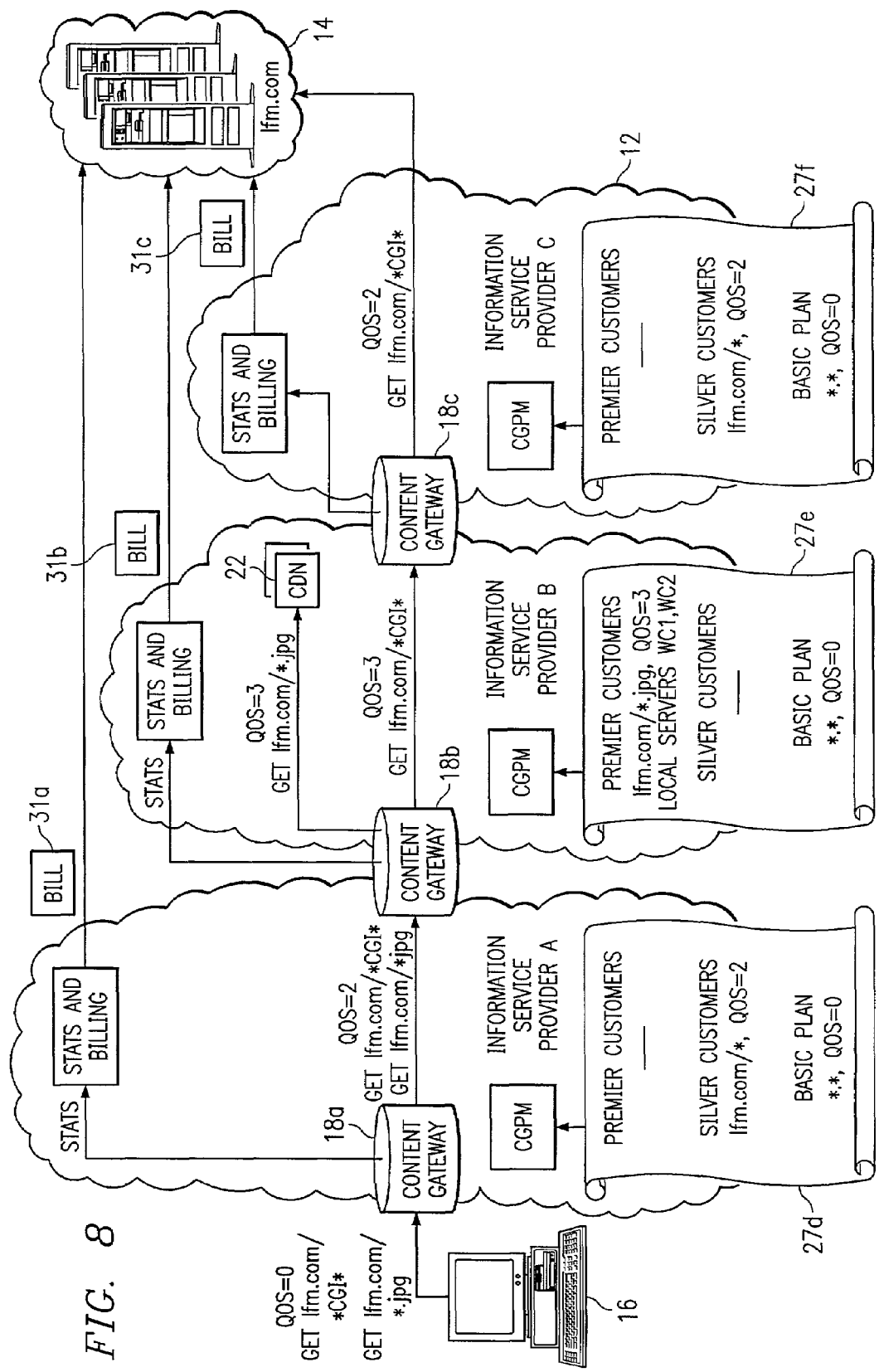
FIG. 8 illustrates a billing model within the multiple information service provider network.

FIG. 8 is a block diagram illustrating a billing model in which a set of content gateways 18*a*, 18*b*, and 18*c* are positioned on the edge of ISP networks in accordance with one embodiment of the present invention. As illustrated in FIG. 8, each internet service provider A, B, and C has its own associated policy manager 26*a*, 26*b*, and 26*c* that reflects the services subscribed to by different internet service provider customers (e.g., content providers or other internet service providers, enterprises, etc.) that are embodied in a set of agreements 27*d*, 27*e*, and 27*f*. Each internet service provider A, B, and C also has its own billing applications that collect usage statistics for all of the customers subscribed to its devices. In the illustrated embodiment, LFM.com has subscribed to a silver service for internet service providers A and C and a premium service for internet service provider B that includes additional data replication and caching capacity via cache 22*a*. As shown in FIG. 8, the quality of service changes as data flows across the internet service provider networks to application service or content provider 14 LFM.com.

The content gateway allows internet service providers to provide value-added services to the internet service provider customer. As such, the billing management requirement is to provide a mechanism allowing the internet service provider to charge their customers where the service is being added. Billing information within system 10 may be collected at the edge of the network on behalf of all the internet service providers involved in the flow of information. To achieve this end, each policy should contain a list of internet service provider identifiers so that information collected for that flow may be associated with each internet service provider. The content gateway may collect the following flow information: the service provider, the URL that was matched by application of the class maps, the source IP address, the internet service provider identifiers, the number of bytes and packets traversed on that flow, a time stamp for the start and end of the flow, etc. This information may be stored or sent periodically to a pre-defined repository for additional processing of this information.

As illustrated in FIG. 8, when the request for information arrives at content gateway 18*a*, it is routed to cache 22 (via content gateway 18*b*) instead of the selected destination (LFM.com) server (via content gateway 18*c*). This reflects a quality of service of level two embodied in agreement 27*d*. Content gateway 18*a* may enable different internet service providers to offer levels of request acceleration based on a corresponding level of service subscribed to. As illustrated in FIG. 8, content gateways 18*a*, 18*b*, and 18*c* also provide the collection of performance statistics (e.g., byte/packet, counts, data rate, etc.) for billing, service level agreement (SLA) validation, and network tuning purposes. A set of invoicing records for bills 31*a*, 31*b*, and 31*c* for an associated application service or content provider 14 LFM.com are also generated by content gateways 18*a*, 18*b*, and 18*c*.

To implement the quality of service policy, content gateway 18 modifies the request according to the quality of service policy from content gateway policy manager 26 or some other policy manager that controls quality of service policies. Once the connection is established to the identified server, content gateway 18 dynamically modifies packets received from client terminal 16 with a quality of service value according to the content policy for the request before the packet is forwarded to the identified server. This quality of service value will reflect a different class of service than that provided by the information service provider 12. The quality of service component of content gateway 18 leverages L2/L3 quality of service features to provide differentiated service to qualified HTTP requests. This may include utilizing class based weighted fair queuing to allow specifying an exact amount of bandwidth to be allocated for a specific class of traffic tied to defined queue limits and drop policies.

As discussed above, HTTP requests are classified at content gateway 18 according to their subscription policy. If the HTTP request is qualified for accelerated service, then a quality of service value is assigned to that traffic by setting the Differentiated Services (diffserv) field (formerly called the type-of-service byte) in the IP header of the request. Requests that do not qualify for accelerated service fall into a best efforts class. The diffserv field is used to signal other nodes in network 10 to provide appropriate service for the requested quality of service class.

Figure 9:
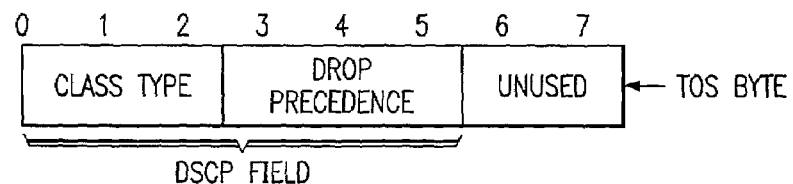
FIG. 9 illustrates the insertion of quality of service policies within a request forwarded across the network.

FIG. 9 shows the diffserv field of the IP header. The diffserv field occupies the first six bits of the IP header TOS byte. DSCP values placed into the diffserv field may represent an expedited forwarding class, an assured forwarding class, and a best efforts class. The DSCP value may also indicate a drop precedence. Table 1 shows examples of possible quality of service policies and Table 2 shows how the quality of service policies relate to requests in content gateway directory 32.

TABLE 1

Example of possible QoS Policy Class

| Policy Class | DSCP |
|---|---|
| class1 (EF) | 101110 |
| class2 (AF1) | 001010 |
| class3 (AF2) | 010010 |
| class4 (AF3) | 011010 |
| class5 (AF4) | 100010 |
| none (BE) | 000000 |

TABLE 2

CG Directory with QoS Class

| Domain Name | App1 | Class | QoS Policy Class | VPN Policy | Server |
|---|---|---|---|---|---|
| *.honda.com | HTTP | *.html,*.jpeg | none | — | 50.20.30.2 |
| cars.honda.com | HTTP | cgibin/*.exe | class2 | — | 10.10.10.11 |
| — | | | — | | — |

Differentiated services are realized by mapping the diffserv field of the IP packet header to a particular forwarding treatment or per hop behavior at each node in network 10 along the request's path. Per hob behavior is implemented by employing a range of queue service and/or queue management disciplines on a network node's output queue. Such disciplines include weighted round robin queue servicing, drop preference queue management, bandwidth allocation, and scheduling priority. Additionally, each node may also provide policing, metering, shaping, out of profile treatment, 802.1p packet marking, and WRED functionality. Other considerations include mapping to multiple path MPLs to take on faster routes to reach the endpoint. Mapping may vary from node to node. Providing packet forwarding priority and bandwidth to requests that qualify for accelerated service guarantees better performance compared to requests that have not been subscribed for such treatment.

Thus, it is apparent that there has been provided, in accordance with the present invention, a system and method for processing a request for information in a network that satisfies the advantages set forth above. Although an embodiment has been illustrated and described in detail, it should be understood that various changes, substitutions, and alterations can be made herein. For example, although the present system has been described with reference to an internet, other communication elements such as wireless communications and desktop applications using an intranet or extranet may utilize the disclosed system while still realizing the present invention. In addition, although the VDNT (34) and the ADNS (24) have been described in association with a router, these elements may be placed anywhere or communicate with any element in the network in order to effect quality of service routing while still realizing the present invention. Also, although the quality of service discussed relates to an agreement between an internet service provider and a content, service, or application service provider, this agreement could be between any two persons or organizations associated with the network. Other examples may be readily ascertainable by those skilled in the art and may be made herein without departing from the spirit and scope of the present invention as defined by the following claims.

APPENDIX A

CGD DEFINITION

| | |
|---|---|
| Classification Policy | Template definition for classifying URL requests. The fields of this part are described in "CGD Classification Policy". |
| Processing Policy | This part of a CGD entry contains the processing actions for the request if it meets the classification policy. The fields of this part are described in "CGD Processing Policy". |

CGD CLASSIFICATION POLICY

| Field Name | Field Description |
|---|---|
| Domain Name | DNS domain name template that identifies a single domain (e.g., cisco.com) or a class of domains. A domain name template may include a prefix wildcard to capture a class of domain names (e.g., *.ibm.com). |
| Application | The application type for a URL. The http application is first priority; others such as ftp, rtsp, etc. will be supported in the future. The content processing will vary on the application type. No wildcards are allowed in this field. |
| Object Class | This field defines class of objects within the domain by specifying a pattern (or template) for matching for the URL. A wildcard ("*") may occur as a prefix or suffix to individual names within the URL or in place of a name. A list of the form {a, b, . . . } following a wildcard limits the value of the wildcard to those elements in the list. For example, projects/eng*{001,002}/graphics/*.*{gif, jpeg} permits eng001, eng002 and all objects of type gif and jpeg. |

CGD PROCESSING POLICY

| Field Name | Req | Field Description |
|---|---|---|
| Quality-of-Service (QoS) | No | This field contains the DSCP[a] value to be inserted in the packet before it is forwarded to the CGR. If this value is 0, the DSCP value received from the client is used. |
| Policy ID | No | This field contains an number that identifies the policy to be used by the CGR and other routers enroute for data transport. A value of 0 denotes default routing. Each non-zero value implies a specific policy that is to be employed. For example, forwarding the packet over an IPSEC tunnel. |
| Cacheability | No | This field indicates: Content is cacheable Content is non-cacheable Cacheability undefined |

-continued

CGD PROCESSING POLICY

| Field Name | Req | Field Description |
|---|---|---|
| CDN flag | No | This flag indicates that the content is delivered by a content delivery network (CDN) If this flag is set and the content is dynamic, CG will query the CDN for the true origin server if it is not known already. If the content is static, the CG will take on the role of a DNS proxy that communicates with CDN content routers to ascertain the IP address of one or more content delivery nodes. |
| DNS server | No | This is IP address of the DNS received from the original DNS request. It is used to when the CG must as a DNS proxy. |
| Time to Live | No | The time interval for refreshing the server IP address(es). If this field is omitted, a system default value is used. |
| Probe | No | Sample probe to determine the best server. e.g. www.honda.com/cars/accord.jpeg The sample probe will be sensitive to requests traversing transparent caches because HTTP requests are routed to a cache that is enroute to the target server. This field is relevant only if explicit configuration of multiple servers is used and HTTP probes is desired. |
| Server(s) | Yes | List of IP addresses of servers that can contain content specified by the object class. This field is mandatory for a CGD entry; however, it may be configured explicitly or dynamically determined. If more than one server is present, the first one is considered primary and the remainder backup. This order may change if, during the next refresh, one of the backup servers becomes more efficient at delivering the content. |

What is claimed is:

1. A system for processing a request for information in a network, comprising:
   a content gateway operable to receive a request for information from a client terminal, the request including a domain name, wherein the content gateway is operable to communicate with a plurality of content providers that are represented by a plurality of content servers and that are operable to process the request, the content gateway operable to forward the request to a selected one of the plurality of content servers based on a domain name of the request and proximity information, wherein the content servers are original servers and the content servers can provide original information in response to the request; and
   a content gateway directory that includes a directory defining a classification policy and a processing policy for the request, the content gateway directory being operable to provide data to determine whether the domain name of the request matches the classification police in the directory, wherein the directory includes subscription information that reflects one or more relationships of one or more content providers associated with one or more of the content servers, and wherein routing of the request is affected by the subscription information.

2. The system of claim 1, wherein the processing policy in the directory identifies a source having information to satisfy the request.

3. The system of claim 1, wherein the content gateway operates as a proxy for the client terminal with respect to an information source, the content gateway being operable to retrieve information from the information source and forward the information to the client terminal pursuant to the request.

4. A method for processing a request for information in a network, comprising:
   receiving a request for information from a client terminal, the request including a domain name;
   identifying a content provider that is represented by a content server to handle the request according to the domain name of the request and proximity data;
   forwarding the request to the identified content provider, wherein the content server is an original server and the content server can provide original information in response to the request; and
   providing a content gateway directory that includes a directory defining a classification policy and a processing policy for the request, the content gateway directory being operable to provide data to determine whether the domain name of the request matches the classification policy in the directory, wherein the directory includes subscription information that reflects one or more relationships of one or more content providers associated with one or more of the content servers, and wherein routing of the request is affected by the subscription information.

5. The method of claim 4, further comprising:
   retrieving the information from the content server to satisfy the request.

6. The method of claim 5, further comprising:
   providing the information to the client terminal.

7. The method of claim 4, further comprising:
   receiving the classification policy;
   comparing the request to the classification policy.

8. The method of claim 7, further comprising:
   receiving the processing policy;
   determining a source of information according to the processing policy in response to the request matching the classification policy.

9. A system for processing a request for information in a network, comprising:
   means for receiving a request for information from a client terminal, the request including a domain name;
   means for identifying a content provider that is represented by a content server to handle the request according to the domain name of the request and proximity data;
   means for forwarding the request to the identified content provider, wherein the content server is an original server and the content server can provide original information in response to the request;
   means for providing a directory that includes a classification policy and a processing policy for the request; and
   means for determining whether the domain name of the request matches the classification policy in the directory, wherein the directory includes subscription information that reflects one or more relationships of one or more content providers associated with one or more of the content servers, and wherein routing of the request is affected by the subscription information.

10. A computer readable medium including code for processing a request for information in a network, the code operable to perform a process comprising:

receiving a request for information from a client terminal, the request including a domain name;

identifying a content provider that is represented by a content server to handle the request according to the domain name of the request and proximity data;

forwarding the request to the identified content provider, wherein the content server is an original server and the content server can provide original information in response to the request;

providing a directory that includes a classification policy and a processing policy for the request; and determining whether the domain name of the request matches the classification policy in the directory, wherein the directory includes subscription information that reflects one or more relationships of one or more content providers associated with one or more of the content servers, and wherein routing of the request is affected by the subscription information.

* * * * *

UNITED STATES PATENT AND TRADEMARK OFFICE
CERTIFICATE OF CORRECTION

PATENT NO. : 6,981,029 B1
APPLICATION NO. : 09/907836
DATED : December 27, 2005
INVENTOR(S) : Menditto et al.

It is certified that error appears in the above-identified patent and that said Letters Patent is hereby corrected as shown below:

Column 17, Lines 65-66, after "classification", delete "police", and insert -- policy --.

Signed and Sealed this

Thirtieth Day of January, 2007

JON W. DUDAS
*Director of the United States Patent and Trademark Office*